United States Patent [19]

Hebsur

[11] Patent Number: 5,429,997
[45] Date of Patent: Jul. 4, 1995

[54] PEST RESISTANT MOSI₂ MATERIALS AND METHOD OF MAKING

[75] Inventor: Mohan G. Hebsur, North Olmsted, Ohio

[73] Assignee: The United States of America as represented by the Administrator of the National Aeronautics and Space Administration, Washington, D.C.

[21] Appl. No.: 43,578

[22] Filed: Apr. 7, 1993

[51] Int. Cl.⁶ .................................. C04B 35/58
[52] U.S. Cl. .................................. 501/97; 428/367; 501/95
[58] Field of Search ............. 501/97, 95; 156/89; 264/60, 102, 122; 428/367

[56] References Cited

U.S. PATENT DOCUMENTS

| 4,927,792 | 5/1990 | Petrovic et al. | 501/92 |
| 4,970,179 | 11/1990 | Petrovic et al. | 501/92 |
| 5,308,806 | 5/1994 | Maloney et al. | 501/97 |

OTHER PUBLICATIONS

Petrovic et al., *A Perspective on MoSi₂ Based Composites,* Material Science and Technology Division Eng. A155, pp. 1–17 (1992).
Berztiss et al., *Oxidation of MoSi₂ and Composition with other Silicide Materials,* Material Science and Engineering, A155, pp. 165–181 (1992).
Chou et al. *Comparative Studies on the Post Reactions of Single and Poly Crystalline MoSi₂,* Scripta Metallurgica et Materialia, vol. 27 (1992).
Vasudevan et al., *A Comparative Overview of Molybdenum Disilicide Composition,* Nov. (1991).
Maloney, M. J. *Develop of High Temperature Mosing Matrix Composites* Feb. 28 (1990).
Maloney, M. J. *Development of Refractory Metal Fiber Reinforced Molybdenum Disilicide,* Jan. 14 (1991).
Chou et al., *Mechanism of MoSi₂ Pest during Low temperature Oxidation,* J. Research Materials, vol. 8, No. 1 pp. 219–213 (Jan. 1993).

Primary Examiner—James J. Bell
Attorney, Agent, or Firm—Gene E. Shook; Guy M. Miller; James A. Mackin

[57] ABSTRACT

A pest resistant molybdenum disilicide composition is provided for use in high temperature structural applications. The composition includes molybdenum disilicide and silicon nitride and can be used to prepare improved reinforced composites.

12 Claims, 8 Drawing Sheets

PEST RESISTANT MOSI₂ MATERIALS AND METHOD OF MAKING

The invention described herein was made in performance of work under NASA Contract No. NAS-3-25266, and is subject to the provision of 305 of the National Aeronautics and Space Act of 1958, as amended, (42 U.S.C. §2457).

BACKGROUND OF THE INVENTION

Several ambitious programs have been initiated to develop the next generation of advanced aircraft for aerospace transportation. It is the goal of programs such as the Integrated High Performance Turbine Engine Technology (IHPTET) program, the National Aerospace Plane (NASP), and the High Speed Civil Transport (HSCT) to develop turbopropulsion capabilities far beyond those achieved using today's technology. To reach these goals structural materials are needed that can withstand extreme temperatures and hostile environmental conditions.

Advanced high temperature materials are the key to successfully developing the next generation aerospace propulsion and power systems. Advanced materials will enhance the performance of these systems by allowing higher speeds, expanded flight ranges, and increased payload capabilities. The materials must be light weight and able to reliably withstand the stresses associated with flight at speeds in excess of Mach 2.5. Due to increased temperature capabilities and relatively low densities, composite materials are widely recognized as the advanced materials needed for future systems.

A principle obstacle to the development of such systems, is the lack of high temperature composite materials having a combination of high specific strength, fracture toughness, high and low temperature oxidation resistance and high temperature creep resistance. To date, only nickel aluminide and molybdenum disilicide appear to have the potential for such high temperature applications as the HSCT exhaust nozzle because most other intermetallic systems exhibit detrimental high temperature oxidation behavior. Of these, molybdenum disilicide appears to be the most favorable candidate because it is a silica former and can withstand temperatures up to 1773K, roughly 473K higher than nickel aluminide which is an alumina former.

The intermetallic compound molybdenum disilicide ($MoSi_2$) has long been known to have excellent high temperature oxidation resistance. It has the additional advantages of low cost, a high melting point of 2300K, a relatively low density of 6.5 gm/cc (versus 8 gm/cc for current engine materials), it is non-toxic and environmentally benign, and can be easily machined using standard metallurgical practices. All of these advantageous properties make molybdenum disilicide an extremely attractive structural material for high temperature aerospace applications.

Unfortunately, the successful use of $MoSi_2$ has been hindered due to its brittle nature at low temperatures, relatively high coefficient of thermal expansion, average creep resistance at high temperatures and, most importantly, its accelerated oxidation at temperatures between about 673 and 773K. The accelerated oxidation of $MoSi_2$ at intermediate temperatures causes the material to disintegrate into powder, a phenomenon known as pesting. Thus, while $MoSi_2$ will perform exceptionally well at higher temperatures, it is unsuitable for structural applications such as high temperature engine components that must be repeatedly heated up through intermediate temperatures. Upon the repeated thermal cycling of such engines the $MoSi_2$ components would simply pest and fall apart.

Pesting is a general term describing the catastrophic oxidation of intermetallic materials at intermediate temperatures. The accelerated oxidation leads to the disintegration or 'pesting' of the material and the component falls apart. For $MoSi_2$ the temperature at which pesting is most pronounced is approximately 773K. It has been observed that at 773K, bulk (i.e., non-composite) $MoSi_2$, as well as composites of $MoSi_2$ with alumina and aluminum nitride, all suffer total disintegration within 100 hours. It was concluded that the pesting of $MoSi_2$ was little affected by the density of materials and the presence of foreign additives. The pested samples yielded powdery products consisting of $MoO_3$ whiskers, $SiO_2$ clusters, and residual $MoSi_2$. The $MoO_3$ whiskers exhibited protruding characteristics and were concentrated at grain boundaries and cracks. The pesting phenomenon in $MoSi_2$ has been concluded to be the result of the formation of voluminous molybdenum oxides in microcracks. While not wanting to be bound by theory, the accelerated oxidation apparently involves the simultaneous formation of $MoO_3$ and $SiO_2$ in amounts essentially determined by the Mo and Si concentrations in the intermetallic.

In the last five years, an extensive amount of work has been carried out in efforts to overcome the problems associated with the use of $MoSi_2$ as a high temperature structural material. While solid solution alloying, dispersion strengthening and fiber reinforcing have had limited success, these approaches still have not made $MoSi_2$ a viable structural material.

Alloying with tungsten, tungsten disilicide or rhenium has improved high temperature creep strength, but not resolved the problems of pesting or matrix cracking. While substantial improvements in high temperature strength have been achieved by dispersing aluminum oxide in the matrix, again the pesting problem has not been resolved.

Known techniques of fiber reinforcement have been unsuccessful at curing this problem because $MoSi_2$ has a relatively high coefficient of thermal expansion (CTE) as compared to most potential reinforcing materials, such as silicon carbide (SIC) fibers. The CTE mismatch between the fiber and the matrix material results in matrix cracking during fabrication and severe matrix cracking during thermal cycling, which of course leads to component failure. Candidate fibers include high strength ceramic fibers such as silicon carbide, single crystal alumina, and ductile, high strength molybdenum and tungsten alloy fibers. Ductile niobium fibers have been shown to improve the low temperature strength and toughness but a severe reaction occurring between the Nb fiber and $MoSi_2$ matrix material limits its use and the high temperature characteristics were not improved at all. While the addition of silicon carbide (SIC) whiskers has yielded improvements in room temperature toughness, pesting and CTE mismatch are still a problem.

In spite of its high CTE, refractory metal fiber reinforcement of $MoSi_2$ matrices was shown to increase both creep strength and toughness. The addition of about 40 vol % of low thermal expansion phase such as SiC in the form of whiskers and particles was shown to lower the thermal expansion of $MoSi_2$ base matrices and reduce matrix cracking of refractory fiber reinforced composites. However, there was a severe reaction between the refractory fibers and the matrix. Matrix cracking was observed during consolidation with a silicon carbide fiber reinforced composite even with the matrix containing up to 40 vol % silicon carbide to modify the thermal expansion. An SCS-6 (silicon carbide)/$MoSi_2$-40 vol % SiC composite survived only 5 thermal cycles at 1573K and was completely destroyed within 100 hours of exposure to air at 773K.

Sapphire fiber reinforced composites showed no evidence of matrix cracking due to the good thermal expansion match between $MoSi_2$ and sapphire, but because sapphire bonds strongly with $MoSi_2$ it does not provide any improvement in the toughness.

While some form of reinforcement with continuous fibers having high strength and high aspect ratio appears necessary for the strength and damage tolerance required for high temperature aerospace applications, a solution to the pesting and matrix cracking problems has still not been found.

Improvements in fabrication of $MoSi_2$ have led to materials having less porosity and correspondingly less susceptibility to pest attack. However, because of increased surface areas and complexities of fabrication from incorporating reinforcement phases in $MoSi_2$ based composites, pesting of the composite material is still a major concern and a principle obstacle that must be overcome before the next generation aerospace goals can be achieved. In short, one of the most promising materials for such applications cannot be used unless a solution to the forgoing problems is found.

SUMMARY OF THE INVENTION

The present invention relates generally to novel molybdenum disilicide based intermetallic compositions suitable for use in high temperature applications, such as advanced gas turbine engines and aerospace structures. It has been surprisingly discovered that molybdenum disilicide ($MoSi_2$)-silicon nitride ($Si_3N_4$) based compositions can be prepared having excellent oxidation resistance at both low and high temperatures, a good coefficient of thermal expansion (CTE) match with reinforcing ceramic fibers such as silicon carbide (SIC) to achieve high toughness, improved high temperature specific strength, creep resistance and other improved mechanical properties. The invention also relates to a method of preparing fully dense (i.e., a tightly packed fine grained microstructure), pest resistant and low CTE $MoSi_2$ materials and composites.

In addition to improved oxidation characteristics, improvements in various mechanical properties are also observed in the inventive materials. Strength is a measure of the resistance of a material to various types of loading. For example, compression strength is a measure of the strength of a material under compressive loading, tensile strength is a measure of a materials strength under tensile loading, bend strength under bend loading and so on. Creep strength is a measure of a materials resistance to time dependent flow under stress and temperature and can measured under compressive, bend or tensile loading. Finally, fracture toughness is a measure of a materials ability to withstand a defect under a particular loading condition before going into catastrophic failure. All of these properties are enhanced in the inventive materials.

According to one aspect of the invention there is provided $MoSi_2$ based matrix materials containing a high volume fraction of fine silicon nitride ($Si_3N_4$) particles. A preferred composition according to the invention comprises at least about 20% by volume silicon nitride based on the combined volume of said molybdenum disilicide and silicon nitride. Still more preferably, the composition of the invention comprises from about 30 to about 50% by volume silicon nitride based on the combined volume of said molybdenum disilicide and silicon nitride. To obtain the advantageous fully dense microstructure of the inventive materials, the silicon nitride should be present in the form of fine particles, preferably having an average particle size of less than about .2 $\mu$m diameter.

The invention also provides for the use of the inventive $MoSi_2$—$Si_3N_4$ composition as a matrix material for fiber reinforced composites to achieve high specific strength and toughness without exhibiting any pesting or cracking during long term thermal cycling at both low and high temperatures. A preferred composite comprises the above-noted molybdenum disilicide/silicon nitride matrix material and a reinforcing material interspersed with the matrix material, wherein the matrix material comprises at least about 50%, and more preferably about 70% by volume of the composite based on the combined volume of said matrix material and the reinforcement material. Preferably, the reinforcing materials are fibers, filaments, whiskers or a combination thereof, formed of a material selected from silicon carbide, tungsten alloys and aluminum oxide ($Al_2O_3$). Still more preferably, the reinforcing material comprises silicon carbide and is present in an amount of about 30% by volume based on the combined volume of said matrix and said reinforcing material.

Another aspect of the invention provides a method of making pest resistant, low coefficient of thermal expansion $MoSi_2$ composites for use in high temperature structural applications. A mixture of molybdenum disilicide and silicon nitride is prepared and milled to obtain an average particle size of less than about 2 micrometers in diameter. The resulting matrix material is then consolidated with a plurality of reinforcing fibers, whiskers or filaments to form a ply or plate of reinforced $MoSi_2$/$Si_3N_4$ matrix material. A plurality of plies of reinforced matrix material are then consolidated in two steps, first by low temperature-high pressure vacuum hot pressing (VHP) and then by low temperature-high pressure hot isostatic pressing (HIP).

Incorporating the silicon nitride according to the multi-step method of the invention obtains fully dense materials without any additives or binders. This minimizes pest attack caused by cracks or impurities in the matrix. Silicon nitride is a ceramic material and, like most ceramic materials, it is difficult to obtain a fully dense composition or composite because of the requirement for additives and binders. Not only do such additives and binders cause cracks and impurities thus rendering the composition not fully dense, they also impart adverse mechanical properties to the materials at higher temperatures. The method of the invention obtains fully dense materials without the need for such additives and binders. Moreover, even those materials of the invention that are not fully dense exhibit superior pest resistance and less matrix cracking.

The combined properties of the method and new materials of the invention provide a great advancement toward achieving the next generation of aerospace transportation by overcoming the principle obstacles preventing the advantageous use of molybdenum disilicide in high temperature aerospace structural applications.

Many additional features, advantages and a fuller understanding of the invention will be had from the following detailed description of preferred embodiments and the accompanying drawings.

DETAILED DESCRIPTION OF THE PREFERRED EMBODIMENTS

Figure 1:
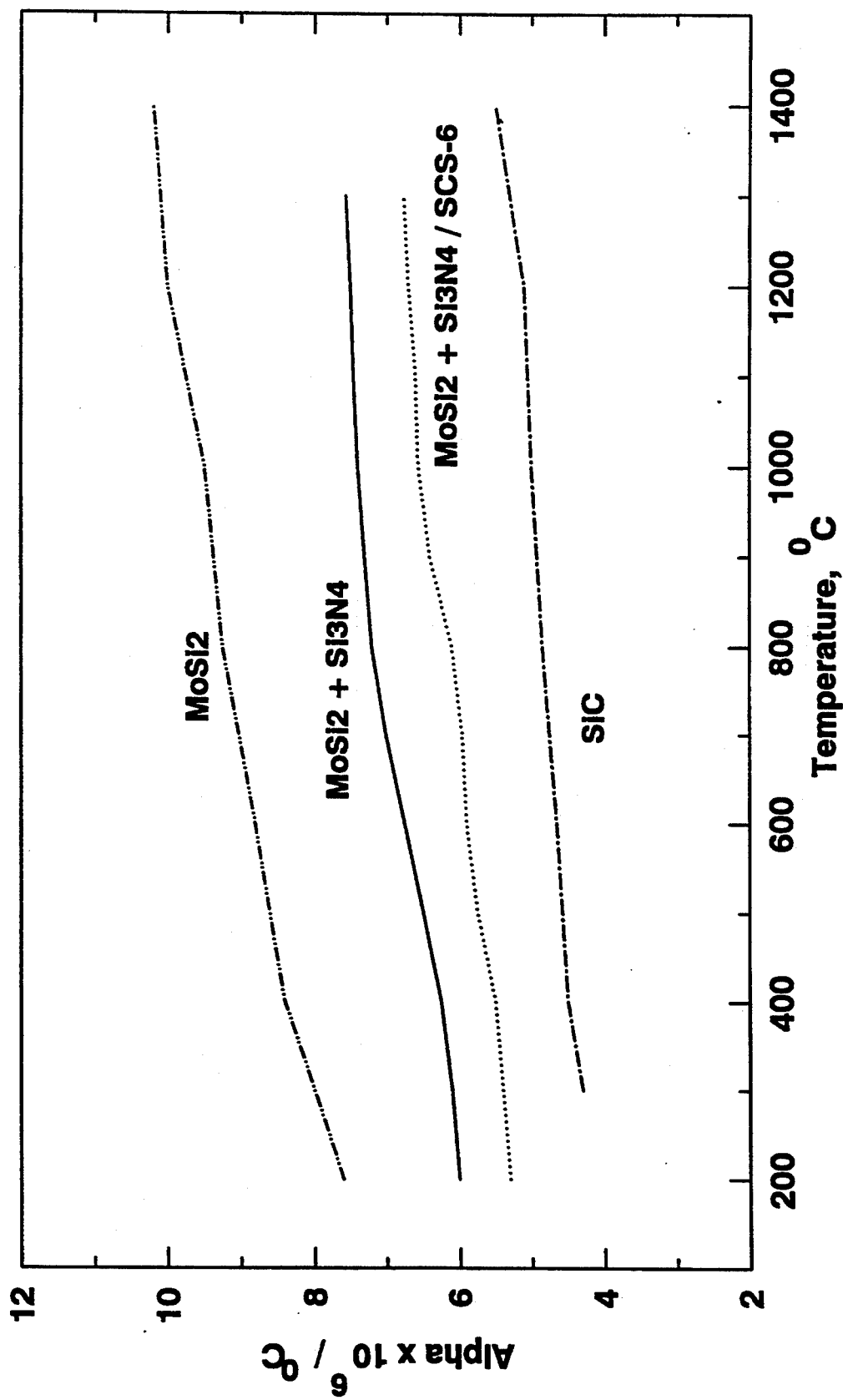
FIG. 1 is a plot showing the reduced coefficient of thermal expansion of a composition according to the invention.

According to the invention, an addition of at least about 20 vol. % of thermodynamically stable and oxidation resistant silicon nitride (Si$_3$N$_4$) particles, having an average particle size of about 1 to 2 microns, to MoSi$_2$, effectively improves both the low and high temperature oxidation resistance of the resulting matrix material as compared with MoSi$_2$ alone. The silicon nitride addition also lowers the CTE, improves the low temperature toughness, high temperature strength and creep resistance of the matrix.

While not wanting to be bound by theory, it appears that the silicon nitride forms a Si$_2$ON$_2$ protective scale or coating on the outer surface of the material at oxidation temperatures. This reaction product is difficult to detect and was not detected on every sample that exhibited the improved characteristics of the invention. It is suspected that the Si$_2$ON$_2$ was not detected in all samples due to limitations of the measuring equipment and that the formation of the Si$_2$ON$_2$ protective reaction product is in fact responsible for at least some of the advantageous properties of the invention. Accordingly, it is important that there be a sufficient stoichiometric amount of silicon nitride to form the protective reaction products. Ideally, silicon nitride is present in an amount of at least about 30 to 50 vol. %.

It is believed that the Si$_3$N$_4$ addition favors the formation of Si$_2$ON$_2$ which prevents or reduces the formation of the MoO$_3$ associated with catastrophic pest failure. The addition of Si$_3$N$_4$ also improves the high temperature oxidation resistance and more importantly, lowers the coefficient of thermal expansion (CTE) of the MoSi$_2$ matrix while at the same time improving the high temperature strength and low temperature toughness. A matrix composition according to the invention may be prepared according to the following non-limiting example.

EXAMPLE 1

MoSi$_2$ based matrix compositions were prepared using Si$_3$N$_4$ having a particle size of about 1-2 microns. The Si$_3$N$_4$ (Kenmord Inc.) was ground in a Union Process Model 1-S attritor mill for about 100 hours using an Si$_3$N$_4$ grinding media of about 6 mm diameter and ball to powder ratio of 20. This resulted in about 95% of the particles being less than about 2 microns in diameter. The MoSi$_2$ was a 98.5% pure, −325 mesh MoSi$_2$ powder obtained from Johnson Matthey Inc., (Aesar Inc.).

Three different 500 gram batches of MoSi$_2$ matrix material were prepared containing 15, 30 and 45 volume % Si$_3$N$_4$, (about 425, 350 and 300 gm MoSi$_2$ and about 75, 150 and 200 gm Si$_3$N$_4$, respectively). The MoSi$_2$ and silicon nitride were blended together for 72 hours in an SiC jar mill containing about 1500 grams of silicon carbide grinding media (6 mm diameter). The blended mixture was further milled in a Union Process Model Research 01HD-1400 cc attritor with an impeller rotation speed of 750 RPM for 8 hours using 6 mm diameter Si$_3$N$_4$ grinding media. The ball to powder ratio was 8:1. To achieve efficient grinding, the outer jacket of the attritor was cooled with continuously flowing liquid nitrogen. After 8 hours of milling, the powder was separated anaerobically from the grinding media in a glovebox under an argon atmosphere. The resulting powdered mixture had an average mean particle size of 1.25±0.71 μm at 99% confidence.

For purposes of testing the characteristics of the resulting matrix materials, the MoSi$_2$—Si$_3$N$_4$ powder compositions were consolidated into 12 cm long by 5 cm wide by 0.3 cm thick plates by vacuum hot pressing (VIP) at 1373K/120 MPa for 1 hour to achieve about 60-70% green density. The vacuum hot pressed plate was enclosed in a tantalum hot isostatic press (HIP) canister along with a silicon carbide back-up plate. The HIP canister was sealed using electron beam welding and then the vacuum hot pressed plate further consolidated by hot isostatic pressing at 1773K/300 MPa for 2 hours. This two step consolidation process enables the use of lower consolidation temperatures than could be used if hot pressing were used alone. This not only reduces the possibility of reaction between the components of the composition, impurities and the like, but also results in a fully dense and fine grained microstructure without the need for additives or binders. The Si$_3$N$_4$ particles were interconnected and well dispersed in the MoSi$_2$ matrix. Although some particle-free regions were evident, the Si$_3$N$_4$ particles appeared to be quite stable, with very little or no reaction with the MoSi$_2$ even at 1773K. In some isolated areas, an Mo$_5$Si$_3$ phase was detected which is probably due to the lack of stoichiometry in commercially available MoSi$_2$.

Advantageously, the properties imparted to the matrix by the silicon nitride make it an excellent composition for the preparation of reinforced composites for use in high temperature structural applications. Because of its lower CTE, the composition can advantageously be employed as a matrix material for continuous fiber reinforcement with, for example, silicon carbide (SIC) fibers.

FIG. 1 shows that the inventive addition of silicon nitride to MoSi$_2$ produces a matrix having a significantly lower CTE than MoSi$_2$ alone. This enables the effective use of MoSi$_2$ as a matrix with SiC fibers for reinforcement. In FIG. 1 the coefficient of thermal expansion (alpha) of the MoSi$_2$ only plate, the MoSi$_2$/30 vol. % Si$_3$N$_4$ matrix, the 30 vol. % SCS-6 reinforced matrix, and SiC are plotted as a function of temperature. It can be seen that the CTE of bulk MoSi$_2$ is substantially higher than that of SiC, which is a principle cause of matrix cracking. The addition of silicon nitride to MoSi$_2$ effectively lowered the CTE of the matrix thereby reducing the CTE mismatch with the SiC fibers and making the matrix and fibers much more compatible. Accordingly, no matrix cracks were found in the inventive composites.

Moreover, no binders or additives are needed. In intermetallic composites, additives and binders are often necessary to obtain suitable microstructures when ceramics are used as a component of the system. The two step low temperature-high pressure consolidation method advantageously enables the production of a fully dense matrix composition without the need for additives or binders, in spite of the use of the ceramic silicon nitride additive. This improves the microstructure and avoids the possibility of reaction between the additives and the other components of the system.

The resulting matrix material has better high and low temperature oxidation resistance, better high temperature strength and creep resistance, and a lower coefficient of thermal expansion than MoSi$_2$ alone. These properties, in combination with the fully dense microstructure offered by the inventive matrix, enables the production of reinforced structural composites that are superior to any material currently known. While most reinforced composites prepared with the MoSi$_2$/Si$_3$N$_4$ matrix compositions of the invention will be superior to those currently used, preparing the matrix material and composites according the inventive method obtains even better composites.

Figure 8:
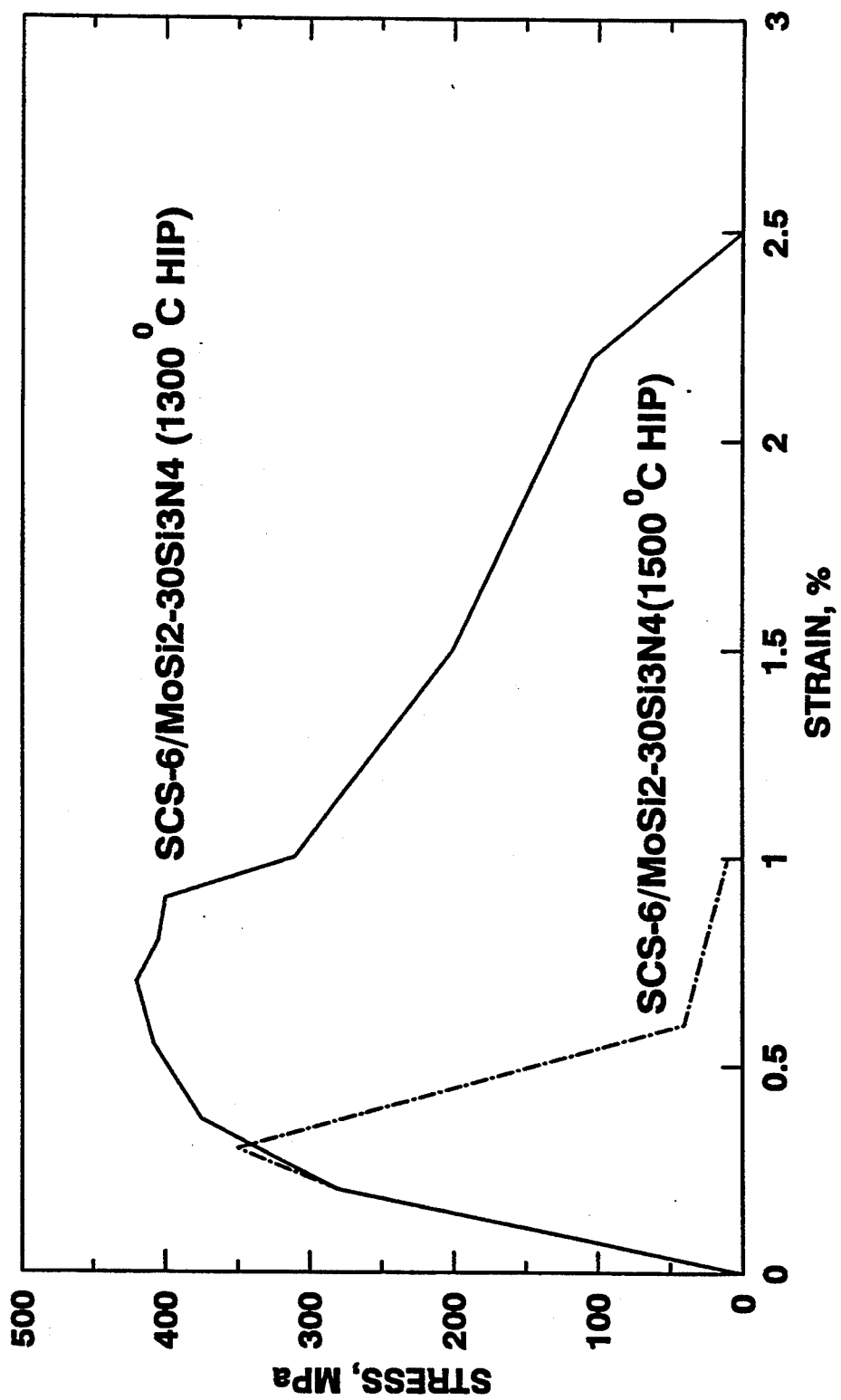
FIG. 8 is a plot of the toughness of materials according to the invention prepared at different consolidation temperatures.

By preparing the composites at lower temperature and higher pressure using a two step process, one can obtain a more stable matrix composition. Using two lower temperature consolidation steps, rather than one higher temperature step reduces the possibility of deleterious reactions between the components of the matrix, impurities and the like. Moreover, by ensuring that the particle size of the matrix components is small, one can also obtain a tightly packed, i.e., fully dense, microstructure for the material which reduces the ability for impurities and oxygen to infiltrate the system. In the case of the preferred silicon carbide reinforcement of the invention, this two step lower temperature consolidation is particularly important because it enables the fibers to retain a useful carbon coating that is believed to be responsible for significant improvements in the mechanical properties of the composites. The improved toughness attributable to the lower temperature consolidation is seen in FIG. 8, discussed further below. Lower temperatures also help the fibers to retain their strength. Superior composites may be obtained according to the method of the invention as described in the following non-limiting example.

EXAMPLE 2

A composite plate was formed from reinforced matrices prepared by the powder cloth technique as is known in the art. The composite consisted of 6 plies of fiber reinforced matrices. Each ply consisted of 70 volume % matrix material formed of MoSi$_2$ and 30 vol. % Si$_3$N$_4$, reinforced with 30 vol % SCS-6 silicon carbide fibers (Textron Inc.), prepared by the powder cloth technique. The details of powder cloth techniques are well known in the art as found, for example, in Pickens et al., NASA Space DM-102060 (1989), incorporated herein by reference. Other techniques known in the art that are suitable for the preparation of fiber reinforced plies and composites include tape casting, and plasma spray such as, for example, the plasma spray process disclosed in U.S. Pat. No. 4,518,625 to Westfall, incorporated herein by reference. The individual plies prepared according to the powder cloth method were then consolidated by a two step process of VHP and HIP using the parameters described in the previous example for the preparation of matrix test plates. Each consolidation step employed lower temperature and high pressure than is typically employed for single step consolidation.

A second composite plate was prepared using identical processing conditions. The individual plies of the second composite were reinforced with ST-300 tungsten filaments interspersed in the above noted MoSi$_2$/30 vol. % Si$_3$N$_4$ matrix material. The filaments were present in an amount of 45 volume %, based on the combined volume of the filaments and the matrix material.

For the purposes of comparison with the composites of the invention, two composite plates using bulk MoSi$_2$ (no silicon nitride) as a matrix were also prepared under identical processing conditions. One plate was reinforced with 30 vol. % of SCS-6 fibers and the other with 30 vol. % Al$_2$O$_3$ fibers, based on the combined volume of the fibers and matrix.

The method and composition of the invention provided reinforced MoSi$_2$ composites that were fully dense and crack free as-fabricated.

A gross examination of electron micrographs of the SCS-6 and ST-300 reinforced composites of the invention revealed that, although fiber distribution was not uniform, there was a marked absence of matrix cracking in the as-fabricated composites. In fact, the SCS-6 and ST300/MoSi$_2$/30 vol. % Si$_3$N$_4$ composites did not exhibit any matrix cracking even after thermal cycling between 1473 and 473K for 1000 cycles. Each cycle consisted of 7 minutes of heating to 1473K and 3 minutes of cooling to 473K. By contrast, the SCS-6 reinforced MoSi$_2$ composite without silicon nitride had numerous matrix cracks due to the CTE mismatch between the matrix and the fiber. While the Al$_2$O$_3$ reinforced MoSi$_2$ composite without silicon nitride also had no matrix cracking due to a good CTE match between the Al$_2$O$_3$ fiber and the matrix, it will be seen that this composite is still highly susceptible to pesting.

Moreover, inspection of electron micrographs of the SiC reinforced composite revealed that the fibers retained their carbon coating, indicating that no reaction occurred between the SiC fibers and the matrix or other impurities. The carbon coating on SCS-6 fiber was retained by consolidating at lower temperatures. This results in superior mechanical properties, in particular, a marked improvement in the low temperature toughness as illustrated in FIG. 8.

The superior high temperature oxidation resistance, low temperature oxidation resistance (pest resistance) and improved mechanical properties of the materials according to the invention, effectively overcome the principle obstacles to the use of MoSi$_2$ as a high temperature structural material.

LOW TEMPERATURE OXIDATION RESISTANCE

Probably the most advantageous property of the inventive materials is their ability to resist low temperature oxidation and the pesting or disintegration associated therewith. In spite of the many advantageous high temperature characteristics of $MoSi_2$, it is of little use as a high temperature structural material if it disintegrates or pests when repeatedly cycled up to operating temperatures. The materials and composites of the invention have excellent low and mid-range temperature oxidation resistance and thus overcome the problem of pesting. While not wanting to be bound by theory, it is believed that this is in part due to the inventive method of preparation, and in part due to the formation of favorable reaction products of the $Si_3N_4$ during oxidation. More specifically, the method of the invention produces fully dense, crack free materials that resist the infiltration of and deleterious reaction with oxygen in the material, and the silicon nitride lowers the CTE and is believed to form a protective silicon oxinitride ($Si_2ON_2$) layer or scale that also inhibits the deleterious formation of $MoO_3$, which is associated with pest failure. The following non-limiting example demonstrates the superior pest resistance of the inventive compositions.

EXAMPLE 3

Two sets of oxidation coupons were prepared, one for testing the oxidation behavior of the $MoSi_2$—$Si_3N_4$ matrix composition and the other for testing the reinforced composites prepared therefrom. The matrix only coupons were obtained by electric discharge machining the as-fabricated plates of $MoSi_2$—$Si_3N_4$ matrix material containing 15, 30 and 45 vol. % $Si_3N_4$ particulates, respectively. The oxidation coupons were $1.2 \times 1.2 \times 0.25$ cm. Another set of $1.2 \times 1.2 \times 0.25$ cm coupons was cut from the SCS-6/$MoSi_2$—30 vol. % $Si_3N_4$ composite using a diamond impregnated wheel on a K. O. Lee machine. The surfaces of the matrix only coupons were gently sand-blasted to remove any residual graphoil from fabrication, and polished to remove any oxide layer on the surface using 600 grit SiC paper. This was followed by a final 1 µm diamond polish. The composite coupons were not polished and the cut surfaces of the coupons had exposed fibers, but no attempt was made to coat the exposed fibers. Both sets of coupons were ultrasonically cleaned in soap and water followed by acetone, and then dried for several hours in vacuum oven at 423K. The surface area and weights of all the coupons were measured prior to oxidation.

Cyclic oxidation tests were conducted on both sets of oxidation coupons at 673K, 773K and 873K for 200 cycles. Each cycle consisted of 55 minutes of heating and 5 minutes of cooling. The samples were withdrawn and weighed every 8 hours for 24 hours and then once a day thereafter. Isothermal oxidation tests were also carried out. Both tests were conducted in a quartz tube furnace. The oxidation coupons were placed in high purity alumina boats and inserted into the center of the tube furnace. All weight gains were measured with a high resolution balance.

Figure 4:
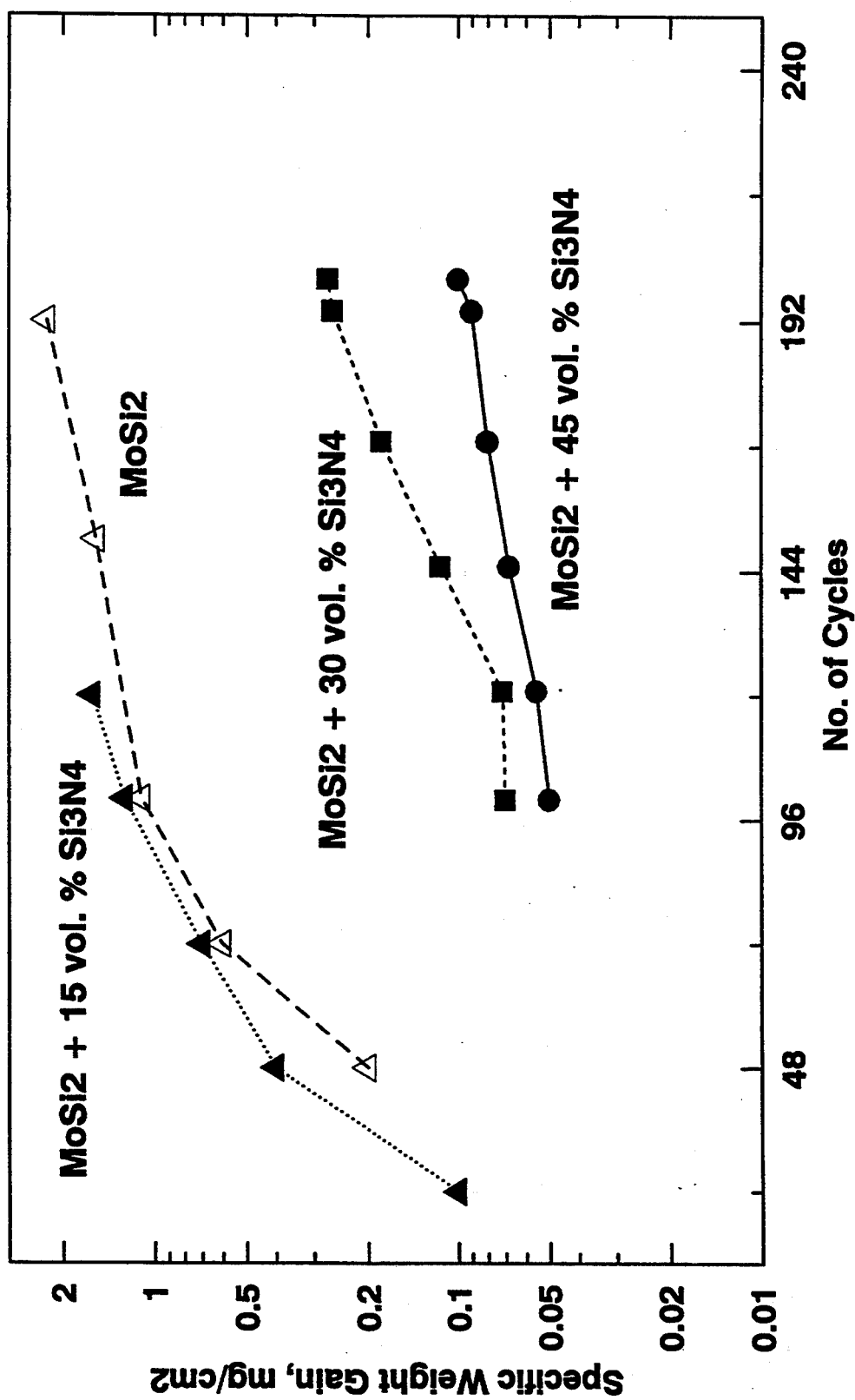
FIG. 4 is a plot comparing the cyclic oxidation resistance of various MoSi$_2$ compositions at optimum MoSi$_2$ pest temperature.

FIG. 4 shows the plot of weight gain per unit area (gm/cm²) versus the number of cycles from cyclic oxidation at 773K in dry air of $MoSi_2$ alone, and the above-noted matrix only coupons of $MoSi_2$ and 15 vol. % $Si_3N_4$, 30 vol. % $Si_3N_4$ and 45 vol. % $Si_3N_4$, respectively. When materials oxidize at high temperatures, they form new oxidation reaction products which manifest themselves as an increase in the weight of the material, measured in FIG. 4 as weight gain in mg/cm². It can be seen that the later two compositions have more than an order of magnitude less weight gain than the high purity $MoSi_2$ alone, which exhibits accelerated oxidation behavior. It should be noted that the $MoSi_2$ data was obtained from Meschter, P. J., *Met. Trans.*, vol. 23A (1992). The $MoSi_2$-15 vol. % $Si_3N_4$ exhibited almost similar weight gains as the high purity $MoSi_2$, and eventually pested after 100 cycles. The 30 and 45 volume % specimens did not pest. The weight gains of the composite coupons are not shown in FIG. 4 because their weight gain was so low as to be negligible and followed the same trend as the 30 and 45 vol. % matrix only specimens.

Figure 5:
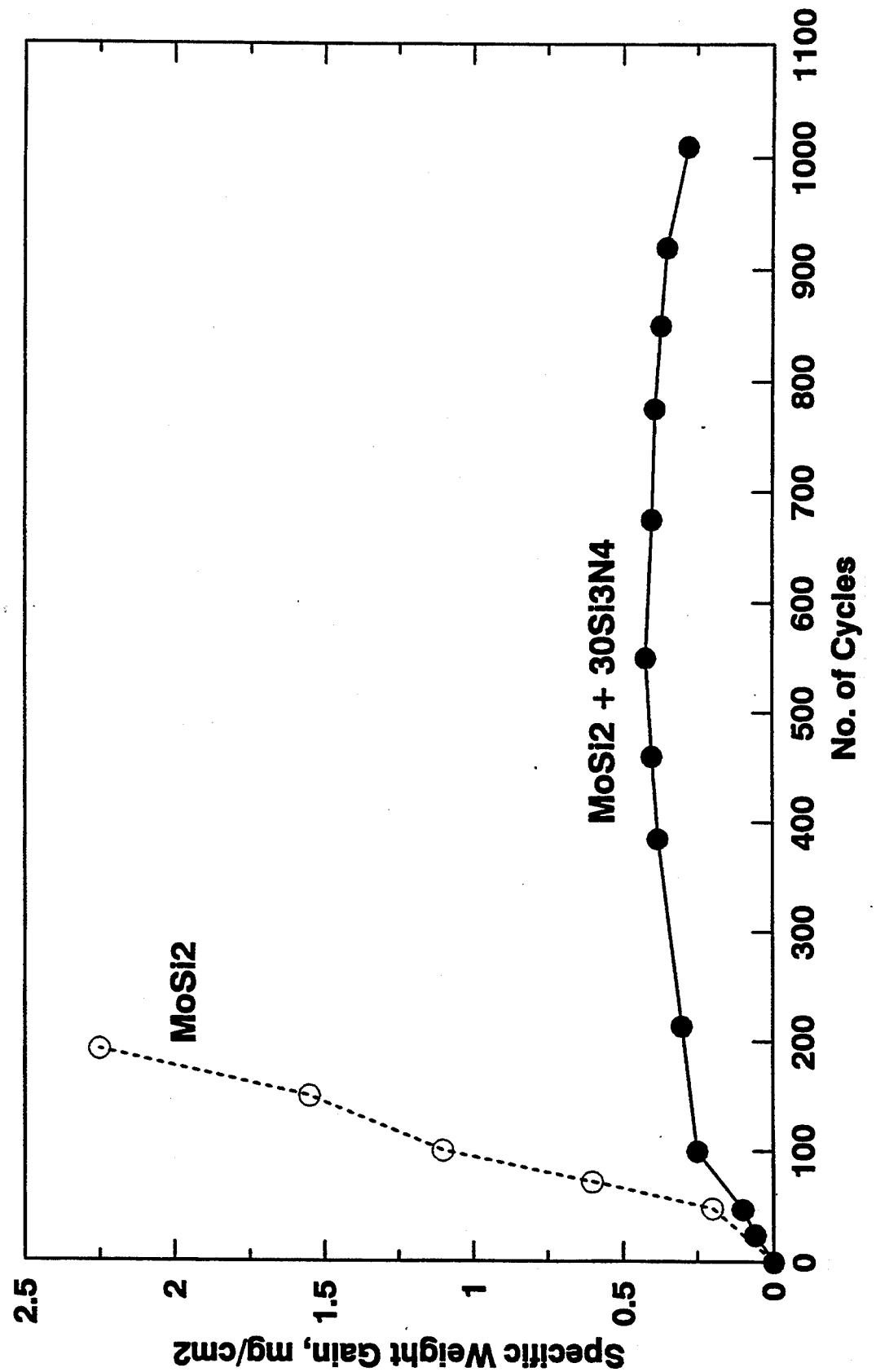
FIG. 5 is a plot of the long term oxidation resistance of a composition according to the invention.

The XRD results indicated the presence of an $MoO_3$ phase in the pested $MoSi_2$ sample, whereas there is a complete absence of the $MoO_3$ phase detected in the $MoSi_2$-30 vol. % $Si_3N_4$ sample. Instead, a predominant $Si_2ON_2$ phase, which appears to function as a protective oxide scale, was detected on the later sample. While not wanting to be bound by theory, the lower weight gain exhibited by $MoSi_2$-30 and 45 vol. % $Si_3N_4$ samples can be attributed to $Si_3N_4$ which is believed to form $Si_2ON_2$ and suppress the oxidation of molybdenum to $MoO_3$. It appears that more than 15 vol. % $Si_3N_4$ is needed to avoid the accelerated oxidation or pest. The pesting of $MoSi_2$-15 vol. % $Si_3N_4$ was likely due to insufficient $Si_3N_4$ to form the protective oxide. The preferred compositions of the invention contain at least about 30 vol % silicon nitride. However, the actual minimum required amount of silicon nitride needed to obtain the advantageous results of the invention is likely dictated by the stoichiometric balance between the silicon nitride and the other components in the system, as well as the amount of oxygen present in the high temperature environment. In any event, the $MoO_3$ that formed on the $MoSi_2$-15 vol. % $Si_3N_4$ sample and in $MoSi_2$ are believed to have triggered the accelerated oxidation which led to the disintegration of the specimen. FIG. 5 illustrates that the weight gain of $MoSi_2$-30 vol. % $Si_3N_4$ changed very little even after 1000 cycles. In this sample there was no sign of $MoO_3$ or pest, which demonstrates that this material may have excellent reliability after long term use as a material for high temperature structural applications. For comparison, the $MoSi_2$ data from Meschter is also shown in FIG. 5.

Table I shows the results of oxidation tests conducted on various materials at 773K in air, which is believed to be the critical pest temperature for $MoSi_2$ materials. The SCS-6/$MoSi_2$ specimen (item 2), which had matrix cracks, was completely destroyed into powder within 24 cycles whereas the SCS-6/$MoSi_2$ 30 vol. % $Si_3N_4$ specimen of the invention was in tact even after 1000 cycles and did not show any pest oxide. An SCS-6/$MoSi_2$-40 vol. % SiC composite also contained some matrix cracks and after 35 hours of incubation period began to pest. After 100 hours this material was reduced to powder. Similarly, even a fully dense $Al_2O_3$/$MoSi_2$ composite, which did not have any matrix cracks due to the CTE match between fiber and matrix, was reduced to powder after 24 hours exposure at 773K.

TABLE I

| Material | Oxidation | Result |
|---|---|---|
| 1. Fully dense $MoSi_2$ | Iso (100 hrs.) | Pest |
| 2. SCS-6/$MoSi_2$ | Cyclic | Pest (24 cycles) |

TABLE I-continued

| Material | Oxidation | Result |
| --- | --- | --- |
| 3. MoSi$_2$/30% Si$_3$N$_4$ | Iso (100 hrs.) | No Pest |
| 4. MoSi/30% Si$_3$N$_4$ | Cyclic | No Pest (1000 cycles) |
| 5. MoSi$_2$/Al$_2$O$_3$ | Iso (25 hrs.) | Pest |
| 6. SCS-6/MoSi$_2$/30% Si$_3$N$_4$ | Iso (196 hrs.) | No Pest |
| 7. SCS-6/MoSi$_2$/30% Si$_3$N$_4$ | Cyclic | No Pest (1000 cycles) |

It is apparent from the fully dense Al$_2$O$_3$ sample that, while improvements in the matrix density, microstructure and CTE match might delay the pest, they will not eliminate it. The pest can only be eliminated by avoiding the formation of MoO$_3$ oxide scale. None of the previous efforts on alloying to avoid pest have been successful. It appears that this can only be achieved by the addition of large volume fraction of fine size Si$_3$N$_4$ according to the invention.

HIGH TEMPERATURE OXIDATION RESISTANCE

Figure 2:
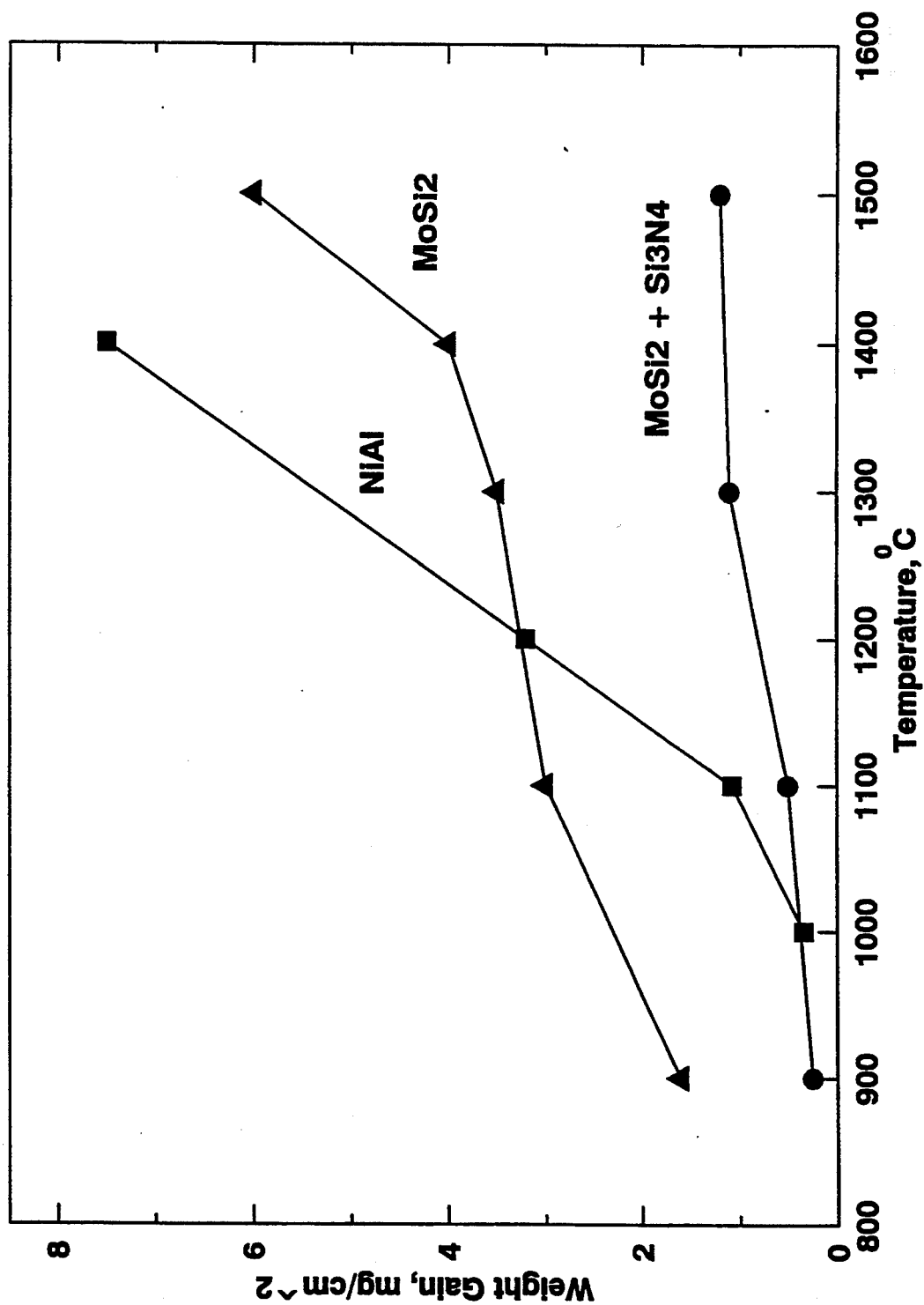
FIG. 2 is a plot showing the improved resistance to isothermal oxidation of a composition according to the invention.

The inventive compositions also exhibit improved high temperature oxidation resistance. FIG. 2 shows the isothermal oxidation weight gain of MoSi$_2$ as compared to the MoSi$_2$-30 vol. % Si$_3$N$_4$ matrix composition of the invention after 24 hours of exposure to temperatures between 1273K and 1773K. It can be seen from FIG. 2 that the MoSi$_2$-30 vol. % Si$_3$N$_4$ of the invention exhibits excellent isothermal oxidation resistance up to 1773K, as manifested by a significantly lower weight gain than MoSi$_2$ alone.

Figure 3:
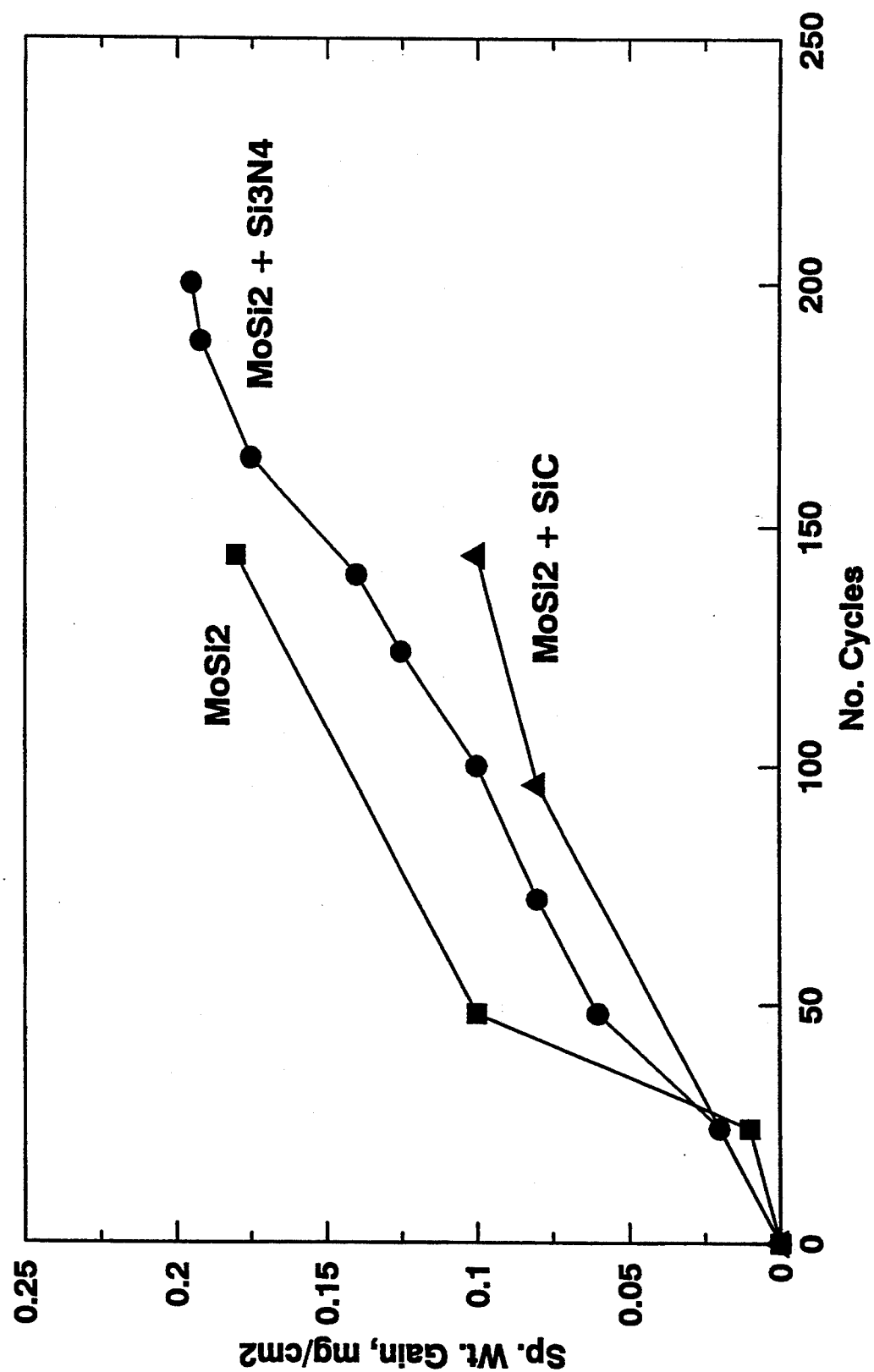
FIG. 3 is a plot showing the improved resistance to cyclic oxidation of a composition according to the invention.

The results of cyclic oxidation tests at 1473K, which more closely approximate the conditions under which the material would be subjected in a structural application, are shown in FIG. 3. The materials in FIG. 3 were subjected to 55 minute heating cycles to 1473K, followed by 5 minute cooling cycles. It can be seen that the MoSi$_2$-30 vol. % Si$_3$N$_4$ matrix composition of the invention exhibited superior oxidation resistance as compared to MoSi$_2$ alone. The x-ray diffraction (XRD) of surface oxides on the MoSi$_2$-30 vol. % Si$_3$N$_4$ composition indicates strong peaks of alpha cristobalite, which is crystalline form of SiO$_2$. It is believed that this also acts as a protective oxide layer during high temperature oxidation.

MECHANICAL PROPERTIES

Figure 6:
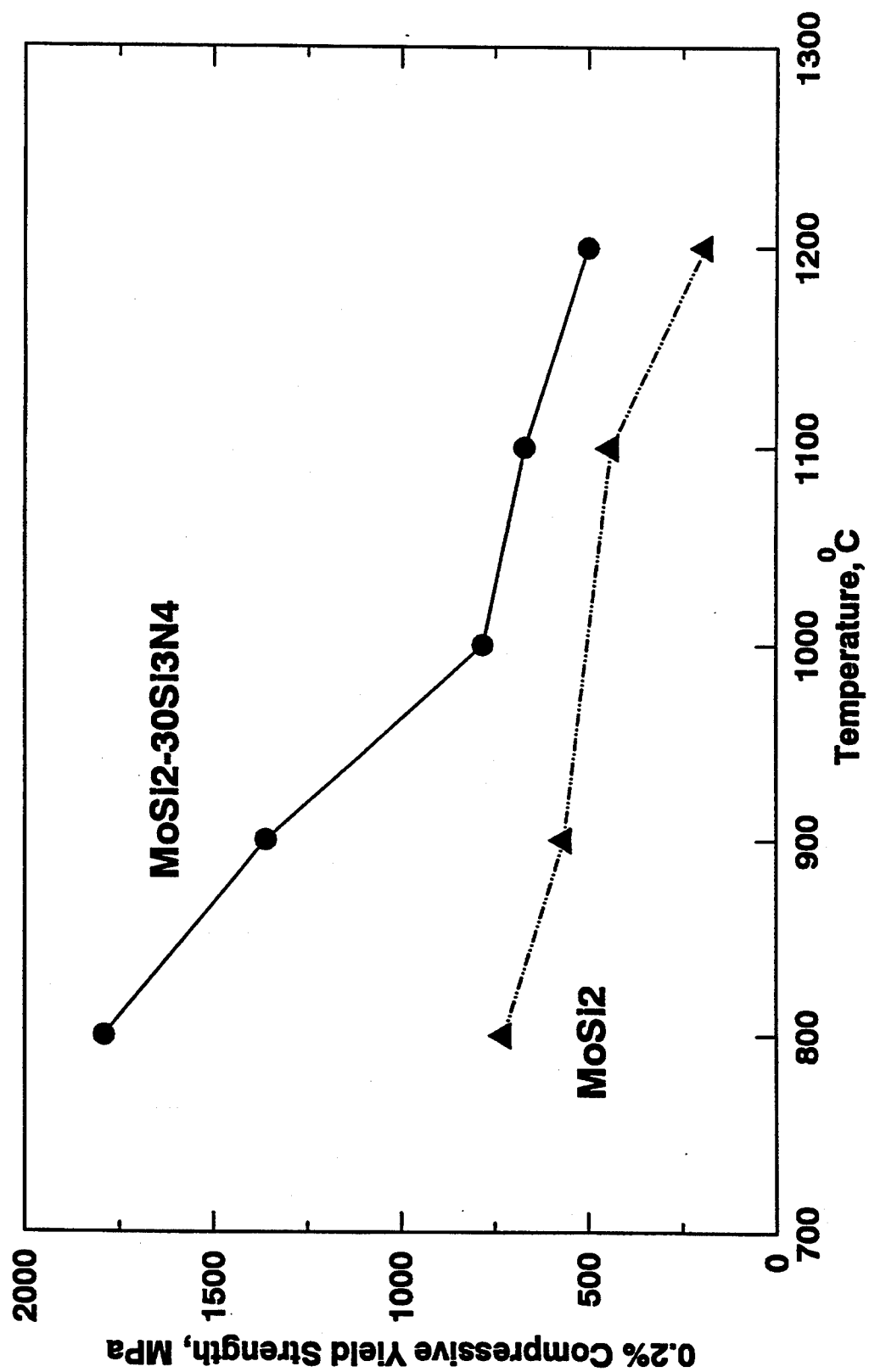
FIG. 6 is a comparative plot of the compression strength of a preferred material according to the invention.

The inventive method and materials also have improved mechanical behavior. Several mechanical properties, such as compression strength and fracture toughness of the MoSi$_2$-30 vol. % Si$_3$N$_4$ matrix were evaluated in accordance with ASTM specifications. FIG. 6 shows a comparison of the compression yield strength of the inventive matrix with that of bulk MoSi$_2$ as a function of temperature. FIG. 6 clearly illustrates that the MoSi$_2$-30 vol. % Si$_3$N$_4$ matrix is nearly two times stronger than MoSi$_2$ at all temperatures between 800° and 1200° C. Room temperature fracture toughness (K$_{Ic}$) of both MoSi$_2$ and MoSi$_2$-30 vol. % Si$_3$N$_4$ were measured on an ASTM standard chevron four point bend specimen. The finite element model was used to calculate the valid K$_{Ic}$. The room temperature fracture toughness of the MoSi$_2$-30 vol. % Si$_3$N$_4$ matrix was about 5.2 MPa√m, nearly twofold greater than the 2.8 MPa√m of MoSi$_2$ alone. The SEM examination of the fractured surface of the inventive matrix indicated isolated areas of Si$_3$N$_4$ particle debonding and pull-out indicating improved toughness, whereas the MoSi$_2$ specimen exhibited a brittle fracture.

Figure 7:
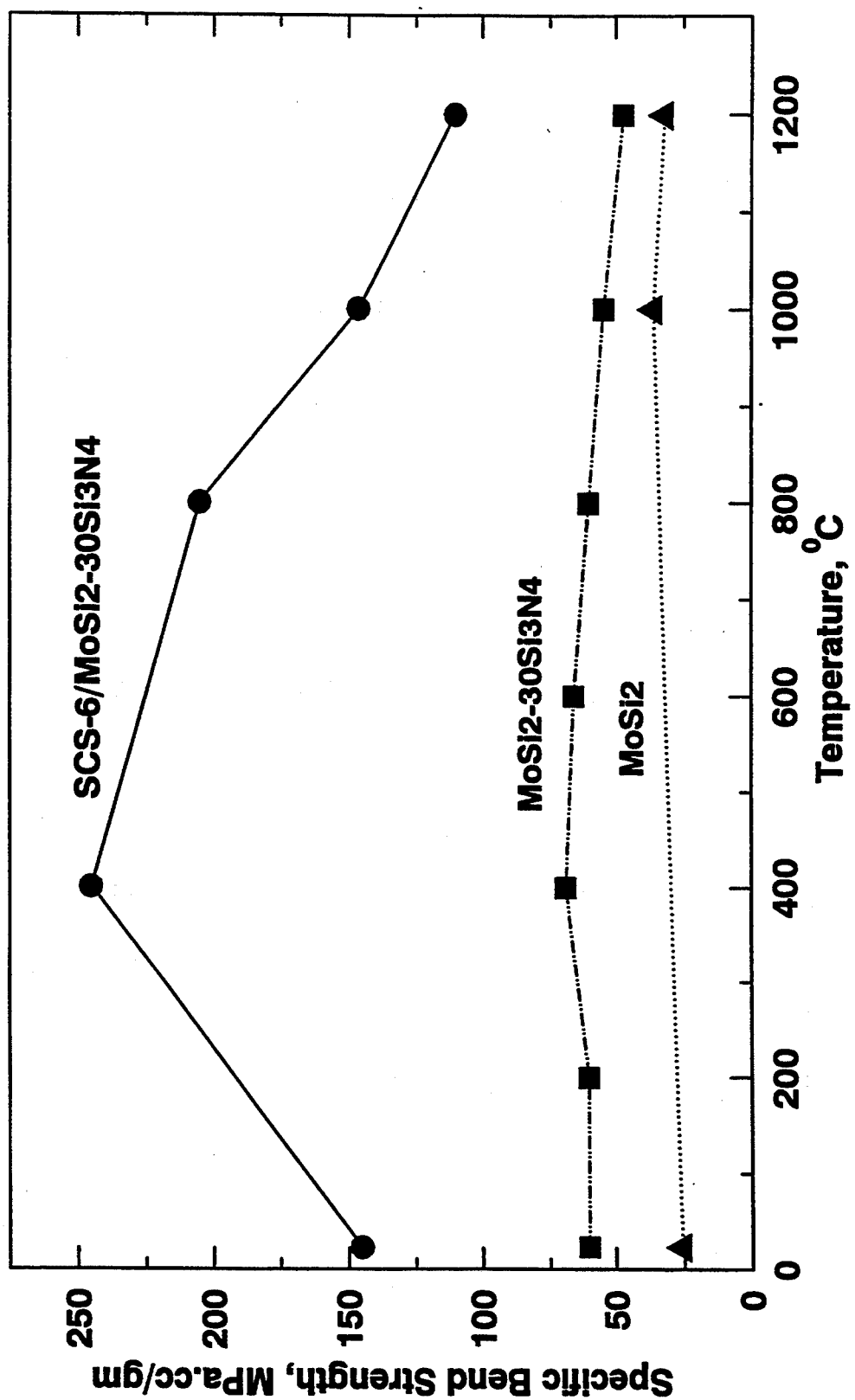
FIG. 7 is a plot of the specific bend strength of materials according to the invention.

The four point bend tests were carried out on the MoSi$_2$-30 vol. % Si$_3$N$_4$ matrix, SCS-6 fiber reinforced MoSi$_2$-30 vol. % Si$_3$N$_4$ composites and bulk MoSi$_2$ at various temperatures. FIG. 7 shows a comparison of the specific bend strengths of these materials as a function of temperature. It can be seen that the specific bend strength of the MoSi$_2$-30 vol. % Si$_3$N$_4$ matrix is slightly higher than that of bulk MoSi$_2$. The SCS-6 fiber reinforced MoSi$_2$-30 vol. % Si$_3$N$_4$ composite exhibited the highest specific strength as compared to all MoSi$_2$ based materials tested at all temperatures. The results of both the compression and bend tests illustrate that the ductile-to-brittle transition temperature of MoSi$_2$-30 vol. % Si$_3$N$_4$ is somewhere between 800° and 900° C.

As noted above, the carbon layer on SCS-6 appears to have a large and even synergistic influence on the mechanical properties, particularly the tensile strain to fracture which is a measure of composite toughness. Gross examination of electron micrographs of as fabricated SCS-6/MoSi$_2$-30 vol. % Si$_3$N$_4$ composites hot isostatic pressed at two different temperatures, namely 1300° C. and 1500° C. indicated that the carbon layer on the SCS-6 fibers was retained in the specimen pressed at the lower temperature. The room temperature tensile stress-strain curves shown in FIG. 8 clearly demonstrate not only improved strength and toughness of the specimen pressed at lower temperature, but also a graceful failure due to fiber pull-out. These advantageous characteristics are not only attributable to the materials involved, but also to the method of preparing these materials according to the invention.

Many modifications and variations of the invention will be apparent to those skilled in the art in light of the foregoing detailed disclosure. Therefore, within the scope of the appended claims, the invention can be practiced otherwise than as specifically shown and described.

What is claimed is:

1. A pest resistant composition for use in high temperature structural materials comprising
   molybdenum disilicide, and
   silicon nitride in the form of fine particles having an average particle size of less than about 2 μm in diameter.

2. The composition of claim 1 comprising at least about 20% by volume silicon nitride based on the combined volume of molybdenum disilicide and silicon nitride.

3. The composition of claim 1 comprising from about 30 to about 50% by volume silicon nitride based on the combined volume of molybdenum disilicide and silicon nitride.

4. A pest resistant composite for use as a high temperature structural material comprising:
   a) a matrix material including molybdenum disilicide and silicon nitride in the form of fine particles having an average particle size of less than about 2 μm in diameter; and
   b) ceramic reinforcing material interspersed with said matrix material.

5. The composite of claim 4 wherein said matrix material comprises at least about 20% by volume silicon nitride based on the combined volume of silicon nitride and molybdenum disilicide.

6. The composite of claim 4 wherein said matrix material comprises from about 30 to about 50% by volume silicon nitride based on the combined volume of molybdenum disilicide and silicon nitride.

7. The composite of claim 4 wherein said matrix material comprises at least about 50% by volume of the composite based on the combined volume of said matrix material and said ceramic reinforcement material.

8. The composite of claim 4 wherein said matrix material comprises at least about 70% by volume of the composite based on the combined volume of said matrix material and said ceramic reinforcement material.

9. The composite of claim 4 wherein said silicon carbide fibers are present in an amount from about 30% by volume based on the combined volume of said matrix and said reinforcing material.

10. A method of improving the pest resistance of a molybdenum disilicide matrix comprising adding silicon nitride in the form of fine particles having an average particle size of less than about 2 $\mu$m in diameter to said molybdenum disilicide.

11. The method of claim 10 comprising adding said silicon nitride in an amount of at least about 20% based on the combined volume of silicon nitride and molybdenum disilicide.

12. The method of claim 10 comprising adding said silicon nitride in an amount of about 30 to about 50% by volume based on the combined volume of said silicon nitride. and said molybdenum disilicide.

* * * * *